United States Patent Office 2,914,526
Patented Nov. 24, 1959

2,914,526

PREPARATION OF STARCH ESTERS

Eugene F. Paschall, Orland Park, Ill., assignor to Corn Products Company, a corporation of Delaware No Drawing. Application August 2, 1956
Serial No. 601,619

8 Claims. (Cl. 260—233.5)

This invention relates to the preparation of starch esters from anhydrides of monobasic organic acids.

Esters of this type have been known previously but methods for their preparation have certain disadvantages. Heretofore, it has been found impossible to react starch with anhydrides of organic acids in an acidic medium without degrading starch to the extent that many of its useful colloidal properties are destroyed.

It is recognized that several early investigators have treated starch with acetic anhydride in the absence of a specific added catalyst at temperatures ranging from ambient to about 150° C. The products obtained were poorly defined, yielding such products as maltose, dextrins and soluble starch after saponification, indicative of severe degradation. R. Sutru (Compt. rend., 195, 1079–80 (1932)) claims that octamaltose is formed when a mixture of starch and acetic anhydride is heated in the temperature range of 70 to 95° C.

According to F. Traquair, acetic anhydride alone has no determinable action on starch (even after two days). At a boiling temperature (140° C.) very little acetylation takes place, with only about 2.5 percent acetic acid fixed after 8 hrs. treatment. After a prolonged treatment (15 to 74 hrs.) using 5 parts of acetic anhydride to 1 part of starch at 90° C., Traquair was able to get some acetylation, 15 to 49 percent acetic acid after saponification.

In these previous investigations, using acetic anhydride, dried starch or starch in which the moisture content was not specified was employed. It appears that previous investigators used starch which was too dry, acetic anhydride in excess, and in no case succeeded in preparing undegraded, low D.S. ungelatinized starch acetate.

It is an object of this invention to provide an improved method for the preparation of starch esters, in undegraded form, from starch and anhydrides of monobasic organic acids. A further object is to prepare such esters in unswollen, granule form. Another object is to prepare halo-substituted starch esters directly from starch and anhydrides of monobasic acids. Other objects will appear hereinafter.

These objects may be accomplished by reacting starch directly with anhydrides of monobasic organic acids. I have discovered, contrary to prior findings, that starch and anhydrides of monobasic organic acids may be reacted under critically controlled acidic conditions to produce non-hydrolyzed starch esters of organic acids if the moisture content of the mixture undergoing reaction is maintained within the range of 8 to 20 percent and the temperature within the range of about 50° C. to about 120° C., and the pH of the reaction mixture is not allowed to go below about 2.5 nor above 5 and the amount of anhydride not exceeding 0.4 mole of starch. If the pH falls below about 2.5, a degraded ester results. The acidity of the system is ascertained by rapidly determining the pH of the reaction mixture dispersed in water. With anhydrides derived from relatively strong organic acids, such as, for example, chloroacetic and chloropropionic acids, the pH of the reaction mixture may be maintained above about 2.5 and, preferably, between 3.0 and 4.0 by incorporation into the starch anhydride mixture before reaction a buffering agent, i.e., a salt of weak acids such as, for example, soluble salts and acid salts of acetic, phosphoric, and citric acids.

In carrying out the reaction, a homogeneous mixture of starch and anhydride, having a moisture content within the range of about 8 to 20 percent, preferably about 10 to 12 percent, is heated at about 50° C. to about 120° C. until the desired reaction has taken place. Thereafter the resulting ester is separated from any unreacted anhydride as by washing with water.

The principles of the present invention are more advantageously applicable to unswollen granule starch since recovery of an unswollen, granule starch ester is easier than one which is gelatinized. However, where there is no objection to gelatinized starch ethers, the principles are equally applicable and advantageous over prior methods.

The anhydrides which are useful in the present invention may be derived from a variety of monobasic organic acids. By way of example, there may be mentioned such anhydrides as acetic, chloroacetic, propionic, butyric, benzoic, which are satisfactory for purposes of the present invention. Mixtures of anhydrides may be used to produce mixed esters of starch. Normally, it would be expected that temperatures within the range of about 50° C. to 120° C. would cause severe degradation of the starch at the low moisture levels employed. However, I have unexpectedly found that such is not the case.

If the anhydride is a liquid, it may be mixed either directly with the starch or diluted with an organic solvent inert to the anhydride and starch and the resultant starch ester, and then mixed with starch. If the anhydride is a solid and/or difficultly soluble in water, a solvent in which the anhydride is soluble, e.g., dioxane, methanol, isopropyl alcohol, dimethylformamide, toluene, hexane may be used to dissolve the anhydride prior to mixing with the starch. Solid anhydrides soluble in and substantially stable toward water, may, of course, be dissolved in water and this solution mixed with the starch, but the moisture content of the mixture at the time of reaction must be in the previously specified range before heating.

The advantages of the present invention are numerous, the principal one being the provision for preparing a thick boiling undegraded starch ester directly by heating a homogeneous mixture of the anhydride and starch. A second advantage is the relatively high reaction efficiencies, 40 to 60 percent generally obtained. Furthermore, the products in the low D.S. range (below about 0.1 D.S.) can be purified by washing with water. Halosubstituted starch esters of monobasic acids may be prepared directly. For example, chloroacetic anhydride will react with semidry starch to form a betachloro starch ester, whereas the reaction in an aqueous system using an alkaline catalyst described in the prior art causes hydrolysis with formation of a beta-hydroxy starch ester.

The following examples which are typical and informative only will further illustrate the invention.

EXAMPLE I

*Preparation of a thick boiling starch acetate*

One mole of raw corn starch, 12 percent moisture, was blended with a solution consisting of 0.1 mole acetic anhydride and 10 ml. of dimethylformamide. The pH was 3.8 (in a water slurry). The mixture was placed in a closed reaction flask and heated 16 hrs. at 50° C. The product was slurried in water, filtered and thoroughly washed with water. A 15 gram Scott viscosity of 91 seconds per 50 ml. of paste was found. The parent starch possessed a Scott viscosity of 75 seconds per 50 ml. of paste. A product D.S. of 0.047 was found.

EXAMPLE II

Preparation of starch butyrate

One mole of raw corn starch, 12 percent $H_2O$, was blended with 0.15 mole of butyric anhydride. The pH was 3.6. The mixture was placed in a 100° C. oven and heated 3 hours at 100° C. at atmospheric pressure. After cooling, the product was slurried in water, filtered and the filter cake washed with 1500 ml. of distilled water. The product gelatinized in hot water to form a long-bodied clear paste. Upon cooling, starch butyrate precipitated from solution as a white curdy mass. Upon reheating the original clear, long-bodied paste was formed showing that retrogradation (a non-reversible crystallization of starch fragments) did not cause precipitation of the derivative.

EXAMPLE III

Preparation of starch chloroacetate

One-tenth mole of chloroacetic anhydride was dispersed in 10 ml. of dimethylformamide and the solution blended with one mole of raw corn starch at 12 percent moisture. Five grams of dibasic sodium phosphate, $Na_2HPO_4.7H_2O$ was dispersed in 10 ml. of water and blended into the mixture air dried to 12 percent moisture (the pH of the mixture was 3.0). The mixture was heated 2 hrs. at 108° C., cooled, and the product slurried in 250 ml. of water (pH=2.95). The slurry was filtered and the filter cake thoroughly washed with water. The product was reslurried in water and neutralized to pH 7 with NaOH. The filter cake was again washed with water and the product air dried. The product contained 0.518 percent chlorine. Twelve grams of this starch, 12 percent moisture, was observed to have a Scott viscosity of 55 seconds per 100 ml. of paste. The parent starch possessed a viscosity of 89 seconds.

EXAMPLE IV

Preparation of starch benzoate

One-tenth mole of benzoic anhydride was dispersed in 25 ml. of acetone and the solution blended with one mole of raw corn starch. The pH of the slurry was 4.2. The mixture was heated in an open oven 2 hrs. at 110° C. The product was cooled, slurried in water, filtered and the filter cake washed with methanol. The filter cake was reslurried in acetone, filtered, and the filter cake washed with acetone. Finally, the filter cake was washed with water. The product was air dried. A paste of the product at 2 percent solids in water formed a stable emulsion with 50 percent aqueous hexane.

I claim:

1. A process of producing low D.S., undegraded starch esters of organic acids in unswollen granule form which comprises heating an intimate mixture of an anhydride of a monobasic organic acid and starch containing about 8 to about 20 percent of moisture at a temperature within the range of about 50° C. to about 120° C., the pH being maintained above about 2.5 and not exceeding 5 during the heating, and recovering the resulting starch ester; the amount of anhydride not exceeding 0.4 mole per mole of starch; said organic acid being selected from the group consisting of acetic, chloroacetic, butyric, benzoic acids and mixtures thereof.

2. Process according to claim 1 wherein the anhydride is chloroacetic anhydride.

3. Process according to claim 1 wherein the anhydride is acetic anhydride.

4. Process according to claim 1 wherein the anhydride is butyric anhydride.

5. Process according to claim 1 wherein the anhydride is benzoic anhydride.

6. Process according to claim 1 wherein a solution of anhydride is a solvent inert to the anhydride, starch, and the resultant ester is mixed with starch and the resulting mixture is used in making said starch ester.

7. Process according to claim 6 wherein the solvent is isopropyl alcohol.

8. Process according to claim 6 wherein the solvent is dimethylformamide.

References Cited in the file of this patent

UNITED STATES PATENTS

| | | |
|---|---|---|
| 2,362,282 | Lindsay | Nov. 7, 1944 |
| 2,376,378 | Murray | May 22, 1945 |
| 2,399,495 | Treadway | Apr. 30, 1946 |
| 2,461,139 | Caldwell | Feb. 8, 1949 |
| 2,589,226 | Carson | Mar. 18, 1952 |
| 2,613,206 | Caldwell | Oct. 7, 1952 |
| 2,627,516 | Lohmar | Feb. 3, 1953 |

OTHER REFERENCES

Seiberlich: "Starch Acetates," "Rayon Textile Monthly," 22, 605, 686 (1941).